United States Patent [19]

Teramo

[11] Patent Number: 4,738,017

[45] Date of Patent: Apr. 19, 1988

[54] METHOD FOR REMOVING AUTOMOBILE PARKING BRAKE CABLE FROM A LEVER

[76] Inventor: Armando Teramo, 17 Oak Pl., Inwood, N.Y. 11696

[21] Appl. No.: 923,434

[22] Filed: Oct. 27, 1986

Related U.S. Application Data

[62] Division of Ser. No. 741,435, Jun. 5, 1985.

[51] Int. Cl.⁴ ............................................. B23P 19/00
[52] U.S. Cl. .................................... 29/426.5; 29/268; 81/302; 81/370
[58] Field of Search ...................... 29/426.5, 452, 268, 29/239; 81/302, 370; 254/10.5

[56] References Cited

U.S. PATENT DOCUMENTS

| | | | |
|---|---|---|---|
| 711,912 | 10/1902 | Steudner | 29/426.5 X |
| 3,327,377 | 6/1967 | German | 29/426.5 X |
| 3,411,261 | 11/1968 | Soddy | 29/426.5 X |
| 4,486,937 | 12/1984 | Teramo | 29/268 |

*Primary Examiner*—Charlie T. Moon
*Attorney, Agent, or Firm*—Frishauf, Holtz, Goodman & Woodward

[57] ABSTRACT

An automotive parking brake cable and lever removing tool includes a prying device secured to one of the handle members of a locking pliers. The prying device has a lever arm that pivots with respect to the locking plier handle member to cause movement of a bifurcated blade-like end portion of the lever arm away from the clamping jaws of the locking pliers. In one embodiment the lever arm of the prying device is coextensive with the locking plier handle members. In another embodiment the prying device includes a fixed arm immovably secured to the locking pliers intermediate the locking plier handle member and the movable lever arm. The lever arm and fixed arm of the prying device extend a predetermined amount beyond the end portions of the locking plier handle members. In another embodiment, a cavity or recess is provided in the spring-engaging face of the bifurcated blade-like end portion of the prying device to securely engage a parking brake cable spring during use of the tool.

5 Claims, 3 Drawing Sheets

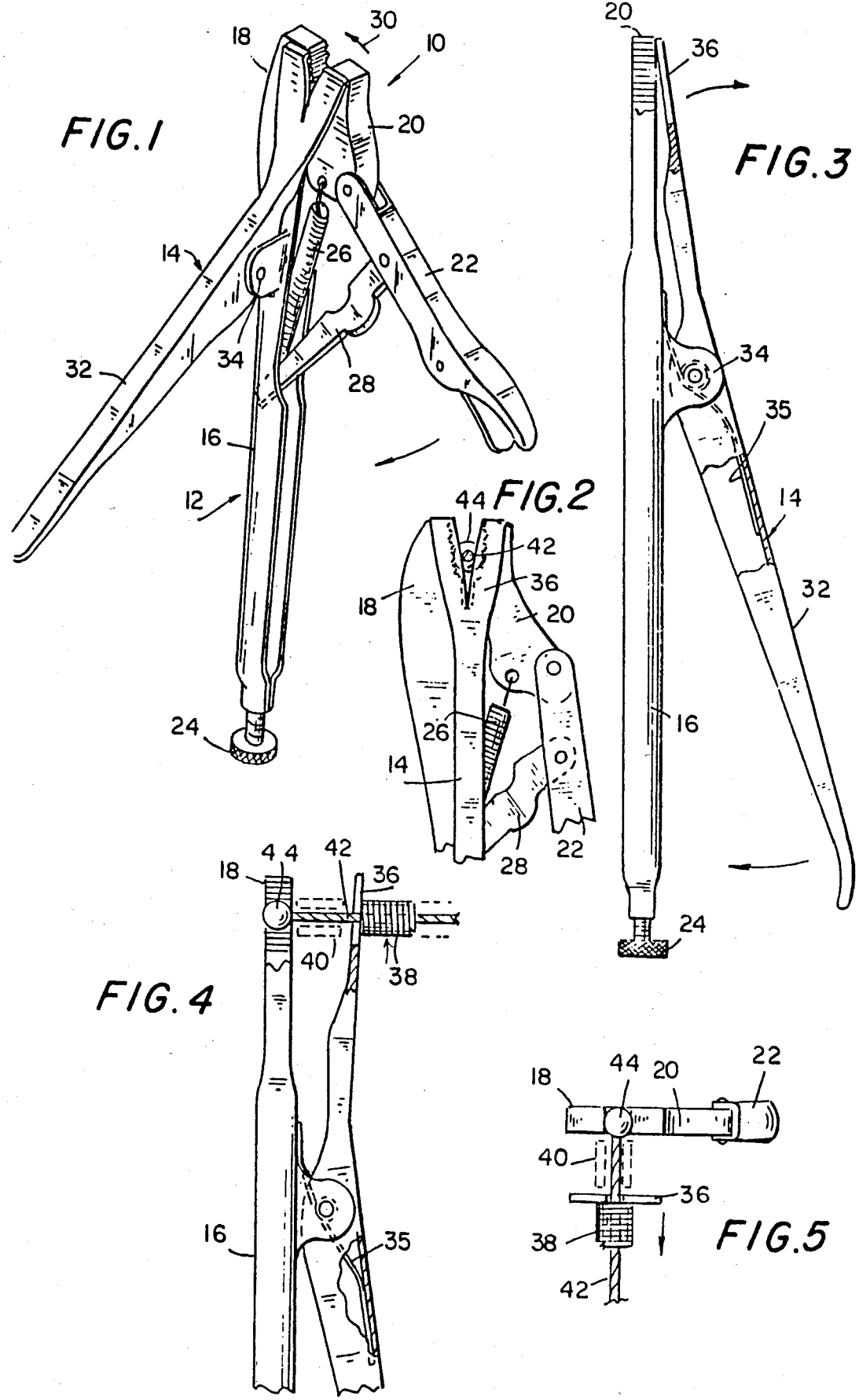

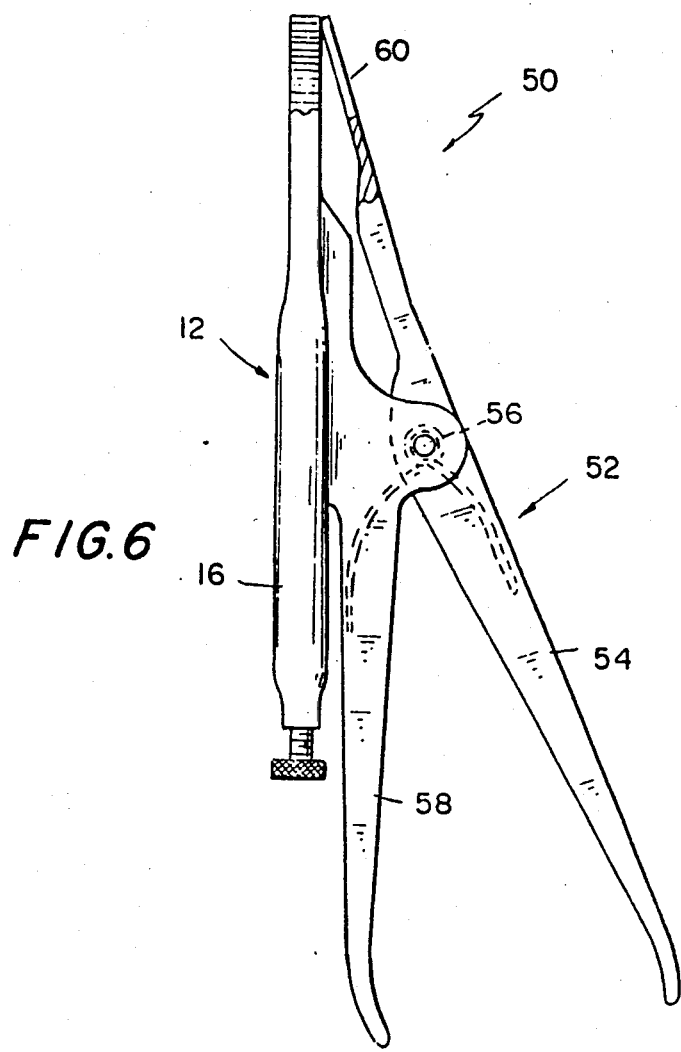

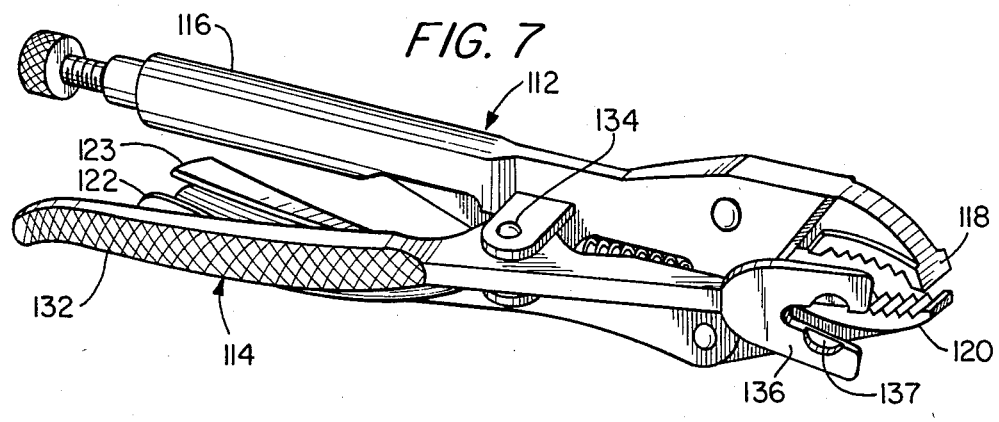
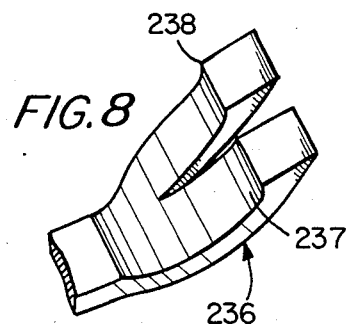
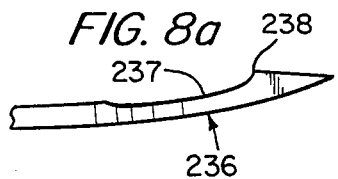
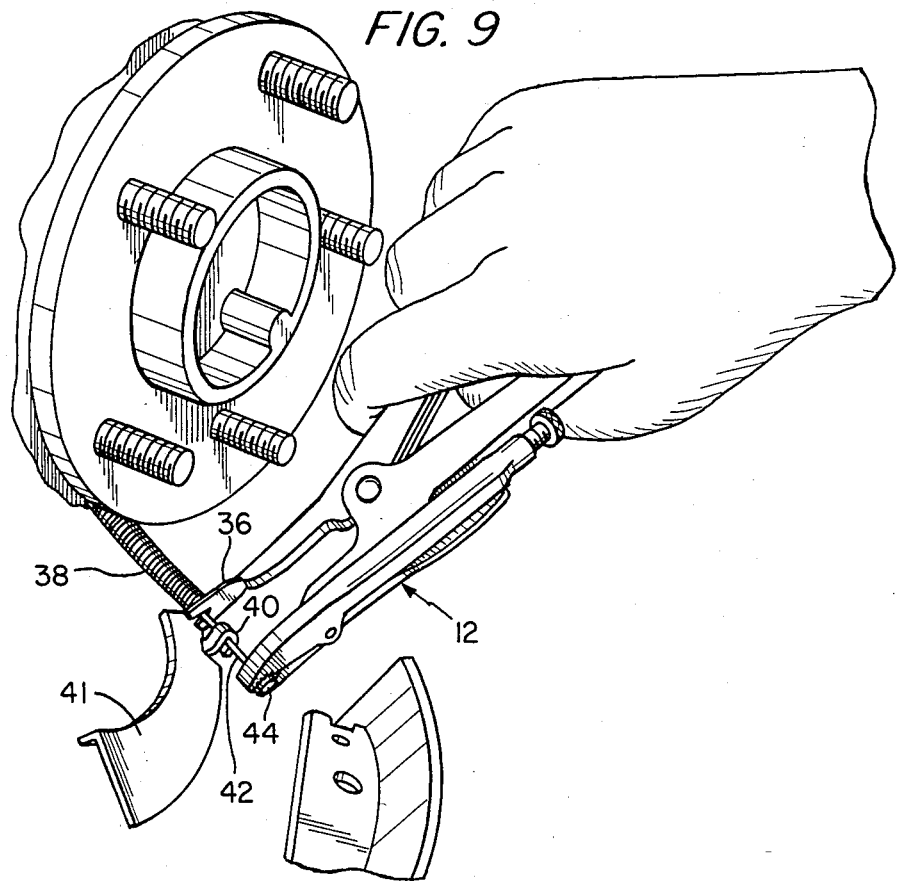

METHOD FOR REMOVING AUTOMOBILE PARKING BRAKE CABLE FROM A LEVER

This is a division of application Ser. No. 741,435 filed June 5, 1985.

CROSS REFERENCE TO RELATED PATENT

U.S. Pat. No. 4,486,937, issued Dec. 11, 1984 to the same inventor as the present application.

BACKGROUND OF THE INVENTION

This invention relates to tools for use on automobiles and more particularly to a tool for releasing a parking brake cable from a brake shoe assembly so as to permit easy removal of the parking or emergency brake lever, also rear emergency brake cable and housing.

Parking or emergency brake systems in automobiles are a well known safety feature, and are usually actuated by pulling a brake handle or depressing a brake pedal into a dented position. In one type of conventional parking brake system, the handle or pedal movement causes a parking brake cable to shift a lever mechanism against a brake shoe to urge the brake shoe against the brake drum. When the parking brake is deactivated, the detent on the handle or pedal is released and a parking brake return spring disposed at an end portion of the parking brake cable urges the parking brake lever away from the brake drum. During replacement or repair of the brakes it is often necessary to remove the parking brake cable from the lever mechanism. This operation is usually tedious since the parking brake return spring which is a helical spring surrounding the brake cable, and a ball-shaped stop piece at the end of the parking brake cable exert substantial compressive forces on the parking brake lever. These forces must be overcome in order to obtain removal of the parking brake cable. A typical removal procedure is to grip the stop piece with a locking pliers, and then force the return spring away from the opposite side of the parking brake lever with a prying tool. When there is clearance between the stop piece and brake lever, and the return spring and brake lever, the parking brake cable can be removed from the brake lever since the forces imposed thereon by the return spring and the stop piece are overcome. Then the lever can be removed from the brake assembly.

The parking brake cable removing operation is generally difficult for one person to perform and is normally a two-man operation, with one person gripping the stop piece while another pries the return spring away from the parking brake lever. Very often the tools slip or become disengaged, and cause injury (sometimes serious) to the person(s) performing the removal operation. Occasionally, the forces necessary to remove the parking brake cable are imposed on the parking brake lever, causing damage to the lever or other parts of the brake assembly.

It is thus desirable to provide a tool which can be operated by one person to grip the stop piece and to pry the return spring away from the parking brake lever to permit removal of the parking brake cable therefrom without causing damage to the parking brake lever or injury to the mechanic.

Among the several objects of the invention may be noted the provision of a novel tool having the combined features of a locking pliers and a prying tool, wherein the locking and prying functions can be performed by one person, and a novel tool wherein the prying function does not require manual gripping of the locking pliers. Another object is to provide an improved prying portion of the tool over that disclosed in my U.S. Pat. No. 4,486,937. Other objects and features will be apparent from the following disclosure.

SUMMARY OF THE INVENTION

In accordance with the invention, the parking brake cable removing tool includes a locking pliers and a prying device secured to one of the handle members of the locking pliers. The prying device has a lever arm with a bifurcated generally pointed blade-like end portion for partially collaring the parking brake cable. The lever arm is pivoted to the first handle member such that pivoting of the lever arm toward the first handle member causes movement of the bifurcated blade-like end portion away from the clamping jaws of the locking pliers. Preferably, the lever arm of the prying member extends substantially to the free end portion of the locking plier handle members. This arrangement assures an efficient development of prying leverage when the lever arm and the locking plier handle members are gripped simultaneously to establish a prying force at the bifurcated end portion.

In another embodiment of the invention, the lever arm extends beyond the locking plier handle members. However, the prying device also includes a fixed arm immovably joined to the locking pliers intermediate the first handle member and the lever arm. The fixed arm and the lever arm extend beyond the end portion of the locking plier handle members and thus permit establishment of a prying force without gripping the locking plier handle members.

In accordance with a further feature of the invention, the bifurcated blade-like end portion of the prying lever has a recess or cavity therein which defines a seat for an engaged portion of the helical brake spring to prevent the spring from slipping off or otherwise becoming disengaged from the blade-like end portion of the prying lever. This improves operability of the tool and increases safety when using the device.

BRIEF DESCRIPTION OF THE DRAWINGS

FIG. 1 is a perspective view of a tool incorporating one embodiment of the present invention;

FIG. 2 is a fragmentary plan view thereof;

FIG. 3 is a side view thereof;

FIG. 4 is a fragmentary side view thereof, in operating position;

FIG. 5 is a top view thereof, in operating position;

FIG. 6 is a perspective view of another embodiment of the invention;

FIG. 7 is a perspective view of yet another embodiment of the invention;

FIG. 8 is a perspective view of a further modified bifurcated blade-like end portion of the prying lever;

FIG. 8a is a side view of the end portion of FIG. 8; and

FIG. 9 shows an example of the tool of the present invention in use.

DETAILED DESCRIPTION

Referring now to the drawings, a parking brake cable removing tool is generally indicated by the reference 10 in FIG. 1. The tool 10 comprises a locking pliers 12, e.g., of the type sold under the trademark Vise-Grip, and a prying lever device 14 pivotally mounted to a handle member 16 of the locking plier 12. A clamping jaw 18 is provided at one end of the handle member 16 and is opposed by a corresponding clamping jaw 20 on a handle member 22. The handle members 16 and 22 are of substantially equivalent extent.

An adjustment screw 24 on the handle member 16, a spring 26 connected to the jaw 20 on the handle member 16 and an intermediate lever arm having one end pivoted to the handle member 22 and an opposite end engaging the screw 24 operate in a wall known manner to set the clamping jaws 18 and 20 to a predetermined position wherein the jaws 18 and 20 close and lock in a direction indicated by the reference 30.

The prying lever device 14 includes a lever arm 32 pivoted at 34 to the handle member 16. A bifurcated generally pointed blade-like end portion 36 is provided at one end of the lever arm 32 for movement toward and away from the clamping jaws 18 and 20. The portion of the lever arm on the opposite side of the pivot 34 from the bifurcated end portion 36 is an operating portion adapted to be manually operated. A biasing spring 35 is optionally interposed between the lever arm 32 and the handle member 16 to normally urge the bifurcated portion 36 toward the clamping jaws 18 and 20. The spring 35 may be omitted. Preferably, the lever arm 32 is long enough to exert a sufficient force, substantially coextensive with the handle members 16 and 22 as most clearly shown in FIG. 3.

As shown in FIG. 4, a helical parking brake cable spring 38 is arranged to bear against one end of a brake lever channel 40. The opposite end (not shown) of the helical cable spring 38 exerts a high force on the parking brake cable 42 which pulls a ballshaped stop piece 44 against the opposite end of the channel 40. The relationship between the helical return spring 38, the channel 40, the cable 42 and the stop piece 44 is well known in the art. The helical spring 38 exerts a very high force, making it very difficult to remove from the lever channel 40.

In operation of the tool 10 to remove the cable 42 from the channel 40, the bifurcated generally pointed blade-like end portion 36 of the prying device 14 is wedged between one of the channel 40 and the return spring 38, or is wedged between adjacent turns of the spring 38 in the vicinity of the channel 40. The sharp blade-like ends of portion 36 facilitate forcing same between the channel 40 and the spring 38 or between adjacent tight turns of spring 38. The clamping jaws 18 and 20 of the locking pliers 12 are then set to grippingly and non-slippingly lock on the stop piece 44. The lever arm 32 of the prying device is manually pressed by the operator toward the handle members 16 and 22 to cause the bifurcated portion 36 to move from the clamping jaws 18 and 20, in a direction substantially perpendicular to the direction in which the clamping jaws 18 and 20 are relatively movable, and thus force the cable spring 38 away from the channel 40, as seen in FIG. 4.

Advantageously the lever arm 32 and the locking plier handle members 16 and 22 can be simultaneously gripped by one hand to establish the prying force needed to pivot the lever arm 32 against the force of spring 38. Moreover, since the clamping jaws 18 and 20 are locked on the stop piece 44, equal and opposite forces are imposed on the stop piece 44 and the spring 38 to facilitate movement of the cable 42 in the channel 40. Under this arrangement no prying forces are imposed on the channel 40, and there is no fear of damage to the channel 40. Once the cable 42 and the stop piece 44 are spaced from the channel 40, the cable 42 can be easily lifted away from the channel 40 with the tool 10. It is of utmost importance that jaws 18, 20 lockingly and non-slippingly clamp onto stop piece 44. To this end, the clamping surfaces of jaws 18, 20 are preferably serrated or have other types of grip improving surface configurations. Thus, as seen from the above, what previously was a difficult one or two man operation, and which was heretofore accompanied with a high risk of injury to the operator(s), can now be done easily and safely by only one person, using only one hand.

In another embodiment of my invention as shown in FIG. 6, a tool 50 comprises a locking pliers and a prying device 52. The prying device 52 includes a lever arm 54 pivoted at 56 to a fixed arm 58, that is immovable joined to the handle member 16 of the locking pliers 12. A bifurcated blade-like end portion 60, similar to the bifurcated blade-like end portion 36, is provided at one end of the lever arm 54 for movement toward and away from the clamping jaws 18 and 20. However, the fixed arm 58 has no such corresponding bifurcated structure. The lever arm 54 and the fixed arm 58 extend a predetermined amount beyond the free ends of the locking plier handle members 16 and 22 at the operator's end for better leverage. In the FIG. 6 embodiment, the locking pliers 12 can be made smaller and shorter than the locking pliers in the embodiment of FIGS. 1-5 since the fixed arm 58 cooperates with the lever arm 54 to separate the stop piece 44 of the cable from the spring 38.

The tool 50 of FIG. 6 is operated in a manner similar to that described for the tool 10. However, because the lever arm 54 and the fixed arm 58 extend beyond the handle members 16 and 22, there is no need to grip the locking plier handle members 16 and 22 to furnish a prying force that will move the bifurcated portion 60. Furthermore, since the lever arm 54 and the fixed arm 58 extend beyond the handle members 16 and 22, a greater prying leverage is obtainable from the tool 50 than would be available from the tool 10, and the lever arm 58 is more easily gripped than the locking pliers of FIGS. 1-5 to produce the prying force.

Referring to FIG. 7, a further embodiment of the invention is illustrated. In the embodiment of FIG. 7, the bifurcated generally pointed blade-like end portion 136 of the pivotally mounted prying lever device 114 has a recess or cavity 137 therein. The prying lever 114 is pivotally mounted at pivot 134 to the locking pliers 112 in a manner similar to that shown in FIGS. 1, 3 and 4. The elements of the locking pliers 112 are the same as the locking pliers 12 of FIG. 1, the various portions thereof being designated with the same reference numerals as in FIG. 1, but incremented by "100".

The handle operating portion 132 of prying lever 114 is curved as shown in FIG. 7, and the hand gripping surface thereof is textured or knurled to prevent slippage when manually squeezing the handle portion 132 toward the locking pliers, in use.

The recess or cavity 137 in the outer surface of the blade-like end portion 136 of the prying lever 114 is generally round in shape in the embodiment shown in FIG. 7 so as to receive the end of the spring 38 therein when the tool is oriented as shown, for example, in FIG. 4. In the embodiment of FIG. 4, it is possible for the spring 38 to slip or the end of end portion 36. By providing the recess or cavity 137 in the end portion 136 as shown in FIG. 7, the spring is seated in the recess or cavity 137 and is retained therein by the side walls of the cavity 137, thereby firmly engaging the spring in the recess or cavity 137 in a manner so that it cannot easily or inadvertently slip out of the cavity 137. This construction provides a great advantage during practical use of the invention. As seen in FIG. 7, the cavity or recess 137 is generally round and extends partially through the thickness of the end portion 136. Typically, the recess 137 may extend thrugh about one-half the thickness of end portion 136.

FIGS. 8 and 8a show another embodiment of the bifurcated blade-like end portion 236 of a pivot lever 114. Only a portion of the modified pivot lever is shown in FIG. 8, the remaining portion being identical with that shown in FIG. 7. As seen in FIG. 8, the blade-like portion has a transverse depression 237 therein. After the tip end of the portion 236 is wedged adjacent a spring 38, the spring 38 passes over the ridge or high point 238 adjacent the depression 237, and then slides into the depression 237. At this point, the spring is lockingly engaged in the depression 237 so that it will not inadvertently slip out of or otherwise become disengaged from the tip end 236. It should be clear that other modifications to the spring retaining portion of the tip end 136, 236 of the prying device 114 can be made, the two illustrated embodiments of FIGS. 7 and 8 being preferred at this time.

FIG. 9 shows a tool of the present invention in use, the jaws of a locking plier 12 engaging an end stop 44. and the blade-like portion 36 of a prying lever 14 engaging a spring 38 which surrounds a cable 42. The member 40 of a parking brake lever 41 is also shown in FIG. 9. When the spring is in the condition shown in FIG. 9, the parking brake lever and its engaging member 40 can be easily removed from the cable 42, without difficulty and without danger.

In some cases, the rear emergency brake cable assemblies become inoperable, for example by "freezing" of the cable and housing, due to rust, contamination, etc. The tool of the present invention is useful for removal of the cable and housing assembly to permit easy replacement thereof, using the same spring housing removal technique described above.

While the invention has been described above in connection with specific embodiments, various modifications and alterations can be made within the scope of the invention as set forth in the appended claims.

I claim:

1. A method for removing an automotive parking brake cable from an associated parking brake lever using a one-hand operable automotive tool, said automotive parking brake cable including a coiled spiral spring, a parking brake cable surrounded by said coiled spiral spring, and a cable end stop piece, said brake lever forming part of an automotive brake shoe assembly and having a channel therein, the channel being fitted between said end stop piece and an end portion of said coiled spiral spring, the one-hand operable tool releasing the channel of said parking brake lever by freeing said channel from said spring, and for reinstalling said parking brake cable on said parking brake lever, said one-hand operable automotive tool comprising:
adjustable locking and gripping pliers, including a pair of adjustable clamping jaws movable in a first direction relative to each other, said clamping jaws having textured surfaces for engaging and locking onto said end stop piece with said textured surfaces contacting said end stop piece;
said locking and gripping pliers having first and second handle members respectively extending from said clamping jaws for operating said clamping jaws, and means on said pliers for setting and locking said clamping jaws in a locked position, wherein said clamping jaws are closable and fixedly lockable on said end stop piece without requiring a maintaining force between said handle members to maintain said locking of said clamping jaws on said end stop piece;
pivot means fixedly mounted on said locking and gripping pliers; and
a prying device having a lever arm pivoted relative to one of said handle members via said pivot means and extending in the same direction as said handle members of said locking and gripping pliers, said lever arm having a bifurcated generally pointed blade-like portion at one end thereof in proximity of said clamping jaws and which is engageable with the spiral coils of said coiled spiral spring, and said lever arm having an operating portion at the other end thereof on the opposite side of said pivot means from said bifurcated portion, said operating portion of said lever arm being substantially aligned with said handle members of said locking and gripping pliers so as to be one-hand operable with said handle members;

said method comprising:
manually squeezing said handle members of said locking and gripping pliers together in said first direction to clamp said clamping jaws of said locking and gripping pliers onto said end stop piece without interposing said clamping jaws between said end stop piece and said spiral spring, with said textured surfaces of said clamping jaws contacting said end stop piece to improve engagement therebetween, said locking and gripping pliers assuming a locked position so as to maintain tight, fixed engagement of said clamping jaws on said end stop piece without requiring a maintaining force between said handle members;
engaging a spiral coil of said spiral spring with said bifurcated portion of said prying device while said spiral coil is under compression, and pressing said bifurcated portion relative to said spiral coil so that said bifurcated portion at least partially surrounds said brake cable which is surrounded by said coiled spiral spring; then
manually gripping said operating portion of said prying device and at least one handle member of said locking and gripping pliers with one hand, and manually moving, with said one hand, said operating portion of said prying device towards said handle members of said locking and gripping pliers so as to cause said bifurcated portion to move away from said clamping jaws in a direction substantially perpendicular to said first direction, and while said clamping jaws are locked onto said end stop piece, to thereby separate said end stop piece from said end of said spiral spring while said clamping jaws are locked onto said end stop piece; then
relatively moving said channel away from said cable while said end stop piece is separated from said end of said spiral spring to remove said cable from said channel free from pressure of said spiral spring and without requiring a maintaining force between said handle members to maintain said locking of said clamping jaws onto said end stop piece; and then releasing said operating portion of said lever arm.

2. The method of claim 1, wherein said bifurcated bladelike portion of said prying device comprises a recess or cavity in the surface thereof which faces away from said clamping jaws, the method comprising engaging a portion of said spiral spring in said recess or cavity to retain said spiral spring engaged with said bifurcated blade-like end portion during operation of said tool.

3. The method of claim 2, wherein said cavity or recess comprises a substantially round cavity or recess extending partially through the thickness of said bifurcated blade-like end portion.

4. The method of claim 2, wherein said cavity or recess comprises a transverse groove in said end portion, said groove being bounded by a ridge extending transversely of said end portion and being closer to the extreme end of said end portion than said groove, the method comprising engaging said spiral spring in said cavity or recess with said ridge preventing disengagement.

5. The method of claim 2, wherein said recess or cavity comprises a depression in said surface which faces away from said clamping jaws, said bifurcated blade-like portion having a first end-most portion having an inclined surface and a relatively sharp remote end, and a depression extending rearwardly of said remote portion and beginning at the end of said inclined portion, the method comprising passing said spiral spring over said inclined portion and into said depression, and retaining said spiral spring engaged in said recess or cavity by a raised ridge which defines the boundary between said depression and said inclined portion.

* * * * *

UNITED STATES PATENT AND TRADEMARK OFFICE
CERTIFICATE OF CORRECTION

PATENT NO. : 4,738,017
DATED : April 19, 1988
INVENTOR(S) : A. TERAMO

It is certified that error appears in the above-identified patent and that said Letters Patent is hereby corrected as shown below:

Title page, left-hand column, under U.S. patent documents, insert:

-- 
| | | | |
|---|---|---|---|
| 3,540,106 | 11/1970 | Goldman | 29/268 |
| 2,489,895 | 11/1949 | Kash | 81/370 |
| 3,969,964 | 7/1976 | George et al | 29/268 X-R |
| 1,465,905 | 8/1923 | Hoff | 81/302 X-R |
| 1,553,623 | 9/1925 | McLeod | 81/302 X-R |
| 3,233,313 | 2/1966 | Roth | 81/302 X-R |
| 1,320,777 | 11/1919 | Mayhew | 29/268 X |
| 2,643,565 | 6/1953 | Mount | 29/268 X |
| 2,656,597 | 10/1953 | Arthur | 81/302 X |

--.

Signed and Sealed this

Twenty-second Day of November, 1988

Attest:

DONALD J. QUIGG

*Attesting Officer*        *Commissioner of Patents and Trademarks*